United States Patent [19]
Niwa

[11] Patent Number: 5,798,928
[45] Date of Patent: Aug. 25, 1998

[54] TOOL SPECIFYING METHOD AND APPARATUS FOR AN NC AUTOMATIC PROGRAMMING SYSTEM

[75] Inventor: Tomomitsu Niwa, Aichi, Japan

[73] Assignee: Mitsubishi Denki Kabushiki Kaisha, Tokyo, Japan

[21] Appl. No.: 6,957

[22] Filed: Jan. 21, 1993

[30] Foreign Application Priority Data

Jan. 28, 1992 [JP] Japan .................. 4-013263

[51] Int. Cl.⁶ .................. G06F 19/00
[52] U.S. Cl. .................. 364/474.22; 364/474.21
[58] Field of Search .................. 364/474.22, 474.26, 364/188, 189, 191, 192, 474.21, 474.27, 474.24

[56] References Cited

U.S. PATENT DOCUMENTS

| | | | |
|---|---|---|---|
| 4,584,649 | 4/1986 | Komanduri et al. .................. | 364/191 |
| 4,591,989 | 5/1986 | Tanaka .................. | 364/188 |
| 4,823,253 | 4/1989 | Shima et al. .................. | 364/474.22 |
| 4,896,273 | 1/1990 | Moore et al. | |
| 4,922,440 | 5/1990 | Kawamura et al. .................. | 364/474.22 |
| 4,972,322 | 11/1990 | Asakura et al. .................. | 364/474.27 |
| 4,992,948 | 2/1991 | Pilland et al. .................. | 364/474.22 |

FOREIGN PATENT DOCUMENTS

| | | |
|---|---|---|
| 0144435 | 6/1985 | European Pat. Off. . |
| 0165999 | 1/1986 | European Pat. Off. . |
| 229849 | 7/1987 | European Pat. Off. . |
| 425674 | 5/1991 | European Pat. Off. . |
| 2522567 | 9/1983 | France . |
| 2523329 | 9/1983 | France . |
| 2-100108 | 4/1990 | Japan . |
| 2-126303 | 5/1990 | Japan . |
| 3-83106 | 4/1991 | Japan . |

OTHER PUBLICATIONS

Patent Abstracts of Japan vol. 16, No. 460 (P–1427) 24 Sep. 1992 & JP–A–41 63 602 (Okuma Mach Works Ltd.) 9 Jun. 1992 *abstract*.

Patent Abstracts of Japan vol. 14, No. 193 (M–0963) 19 Apr. 1990 & JP–A–20 36 046 (Fanuc Ltd.) 6 Feb. 1990 *abstract*.

Patent Abstracts of Japan vol. 13, No. 405 (M–868)(3753) 7 Sep. 1989 & JP–A–01 146 644 (Fanuc Ltd.) 8 Jun. 1989 *abstract*.

Robotics and Computer Integrated Manufacturing vol. 7, No. 1/2, 1990 Oxford GB pp. 133–141, XP000140352 H.K. Tonshoff & H. Dittmer *p. 139, left col., paragraph 2*.

*Primary Examiner*—James P. Trammell
*Attorney, Agent, or Firm*—Sughrue, Mion, Zinn, Macpeak & Seas, PLLC

[57] ABSTRACT

In an NC automatic programming system for defining the process and equipment for machining a workpiece, a method and apparatus for automatically selecting a tool out of a plurality of available tools for machining the workpiece. The data defining the tools and data defining the criteria for selecting the most appropriate tool on the basis of machining mode are entered and stored. On the basis of the entered data, the available tools are arranged automatically according to preference for the desired machining. The recommended tool may be accepted or another of the recommended tools may be selected at operator discretion and based on operator experience.

17 Claims, 22 Drawing Sheets

Fig. 4

| T No. | SPARE | SHAPE | NOSE R | ROTA-TION HAND | GROOVE DEPTH ENTERING ANGLE | NOSE WIDTH NOSE ANGLE | CODE NAME | HOLDER | TOOL WIDTH | TOOL LENGTH |
|---|---|---|---|---|---|---|---|---|---|---|
| 1 2 3 ⋮ 16 | ② | ③ | ④ | ⑤ | ⑥ | ⑦ | ⑧ | ⑨ | ⑩ | ⑪ |

PAGE ⑫

* TOOL DATA (2) *

Fig. 5

| MACHINING MODE | DIVISION | TOOL TYPE 1 | TOOL TYPE 2 | TOOL TYPE 3 | CONDITION 1 | CONDITION 2 | CONDITION 3 | CONDITION 4 | CONDITION 5 | CONDITION 6 |
|---|---|---|---|---|---|---|---|---|---|---|
| BAR-OUT | R | GNL-OUT | | | A95:* | B60:* | R0.3:* | | | |
| BAR-OUT | F | GNL-OUT | | | A120:* | B45:* | R0.15:* | | | |
| BAR-IN | R | GNL-IN | | | A95:* | B60:* | R0.3:* | W0:150 | | |
| BAR-IN | F | GNL-IN | | | A110:* | B50:* | R0.2:* | W0:150 | | |
| BAR-FCE | R | GNL-FCE | GNL-OUT | | A95:* | B50:* | R0.3:* | | | |
| BAR-FCE | F | GNL-FCE | GNL-OUT | | A125:* | B45:* | R0.15:* | | | |
| ... | | | | | | | | | | |
| DRL-OUT | R | DRL-OUT | | | W0:* | | | | | |
| DRL-FCE | R | | | | W0:* | | | | | |
| ... | | | | | | | | | | |

Fig. 7

| P No. | MATERIAL | OD | ID | STOCK LENGTH | | | | | | |
|---|---|---|---|---|---|---|---|---|---|---|
| 0 | S45C | 120 | 0. | 90. | | | | | | |

| P No. | MODE | # | DEPTH OF CUT X | DEPTH OF CUT Z | | | | | | |
|---|---|---|---|---|---|---|---|---|---|---|
| 1 | BAR-OUT | 0 | 120. | 0. | | | | | | |

| SEQ | SHAPE | FRONT CORNER | STARTING POINT X | STARTING POINT Z | END POINT X | END POINT Z | ... | ... | R TOOL | F TOOL |
|---|---|---|---|---|---|---|---|---|---|---|
| 1 | LIN | | ◆ | ◆ | 60. | 20. | ... | ... | —15 | ... |
| 2 | TPR | | 60. | 20. | 100. | 30. | ... | ... | ... | ... |
| 3 | LIN | | ◆ | ◆ | 100. | 50. | ... | ... | ... | ... |

| P No. | | | | | | | | | | |
|---|---|---|---|---|---|---|---|---|---|---|
| 2 | ... | ... | ... | ... | ... | ... | ... | ... | ... | ... |

| MACHINING MODE | DIVISION | TOOL TYPE | CONDITION 1 | CONDITION 2 | CONDITION 3 | CONDITION 4 | CONDITION 5 | CONDITION 6 |
|---|---|---|---|---|---|---|---|---|
| .... | | .... | .... | .... | .... | .... | .... | .... |
| BAR-FCE | R | GNL-FCE | a1 | a2 | a3 | a4 | a5 | a6 |
| | | GNL-OUT | b1 | b2 | b3 | b4 | b5 | b6 |

Fig. 20

```
TOOL DATA
TOOL MANAGE-
MENT NUMBER │ TOOL MANAGEMENT NAME          │ T CODE │ H CODE │ D CODE
             │ NOMINAL  │ TOOL  │ MATE- │
             │ DIAMETER │ NAME  │ RIAL  │
   0001        4.000    DRILL   HSS      T100     H01      D01
   0002        4.100    DRILL   HSS      T101     H02      D02
   0003        4.200    DRILL   HSS      T103     H03      D03_
   0004       [4.300]
                 \10A

INPUT          INSERT   DELETE    SEARCH
   9a      9b      9c       9d        9e
```

TOOL SPECIFYING METHOD AND APPARATUS FOR AN NC AUTOMATIC PROGRAMMING SYSTEM

BACKGROUND OF THE INVENTION

1. Field of the Invention

The present invention relates to a tool specifying method in an NC automatic programming system.

2. Description of the Background Art

When a machining program or the like is defined in an NC automatic programming system employing an automatic programming unit, a CNC unit, etc., the particular tool to be used may be specified according to each machining process in the machining program.

It is known in the art that a particular tool to be used may be specified in a program by entering a corresponding tool management number. That number is selected from plural specific tool management numbers, each corresponding to a respective tool and each having been set and stored beforehand in the system. To specify a tool in this method, it is necessary for an operator to understand the relationships between the tools and corresponding tool management numbers in advance. When a large number of tools are handled, however, it is virtually impossible for an operator to memorize such correspondences. Accordingly, the operator identifies the tool management numbers corresponding to the tools to be used by referring to a prepared correspondence chart or the like indicating the relationships between the tools and tool management numbers. However, this method consumes much time and labor to retrieve the required tool management number and may result in specifying an incorrect tool due to misreading of the chart.

To solve such disadvantages, a tool specifying method as disclosed in Japanese Patent Disclosure Publication No. 83106 of 1991 has been devised, in which a pre-defined tool management name consisting of a tool name, a nominal diameter, etc. is entered to specify a tool.

The art disclosed in Japanese Patent Disclosure Publication No. 83106 of 1991 will now be described. FIG. 22 is a block diagram showing the major components of an NC automatic programming unit serving as an automatic programming system. The numeral 1A indicates a processor (hereinafter referred to as the "CPU"), 2A a ROM storing a control program for controlling said automatic programming unit, 3A a RAM acting as storing means for storing various programs and data loaded from a floppy disk FL, the operation processing results of the CPU 1A, etc., 4A an NC data memory for storing NC data created, 5A a keyboard, 6A a disk controller, and 7A a CRT device serving as an interactive visual display. Elements 1A to 7A are connected by a bus line 8A.

The keyboard 5A serving as data entry means is provided with alphanumeric keys, an execute key, cursor moving keys, etc. The CRT display device 7A may have a plurality of soft keys 9a to 9e (FIG. 20) and menu keys (not shown), which constitute part of the data entry means and are disposed along the bottom of the display screen.

Available as a floppy disk FL is a system disk having a preset storage area (hereinafter referred to as the "file") for correspondingly storing tools and tool identifying data, in addition to various programs required to create NC data, register tool data and specify tools.

A tool specifying method in this example will now be described with reference to a flowchart in FIG. 18, illustrating the general processing of registering the tool data stored on the floppy disk FL acting as the system disk, and a flowchart illustrating general tool specifying processing in FIG. 19.

The operator first powers up the NC automatic programming unit, sets the floppy disk FL into the disk controller 6A, and loads various programs and data stored on the floppy disk FL into the RAM 3A in accordance with the processing of the CPU 1A driven on the basis of the control program stored in the ROM 3A.

The CPU 1A then displays options, which represent processings corresponding to various programs loaded into the RAM 3A, on the CRT display device 7A in an interactive mode, and waits for the operator to select any option by depressing a corresponding menu key. The operator depresses the desired menu key to select the option to be executed.

When the option for "registering tool data" has been selected, the CPU 1A switches the display of the CRT display device 7A to a tool data setting screen, initiates the tool data registering processing, and waits for data input.

FIG. 20 is a schematic diagram showing the tool data setting screen. The operator hereafter enters various data representing tool attributes sequentially via the tool data setting screen serving as an interactive screen. The data that can be registered as data indicating the tool attributes includes: a tool management number, a nominal diameter, a tool name, a material, a T code (tool number), an H code (tool length offset number) and a D code (tool diameter offset number). In this example, the nominal diameter, tool name and material are necessary and sufficient as data specifying a tool. Character string data displaying the nominal diameter, tool name and material constitutes a "tool management name". As previously explained, the "tool management number" is data comprising a character string (numeral) corresponding one-for-one with each tool.

Now, the operator first controls the cursor moving keys on the keyboard 5A to move a cursor 10A on the CRT display device 7A to the position of a required item, and depresses the soft key 9a (INPUT key) to declare to the CPU 1A that the processing to be performed from now on is data input. Then, the operator sets character strings to each item by controlling the alphanumeric keys of the keyboard 5A. When the displayed string is found to be correct, the operator depresses the EXECUTE key to store the character strings into the RAM 3A on an item basis, thereby registering the character strings of the tool management number, nominal diameter, tool name, material, T code, H code and D code on a tool basis (FIG. 20). The data of each tool thus registered is finally stored into the file of the floppy disk FL via the disk controller 6A (for the above operation, refer to step S101A in FIG. 18). By specifying the processing to be executed by depressing any of the soft keys 9b to 9e with the tool data setting screen displayed, data can be inserted (key 9c), deleted (key 9d) or retrieved (key 9e). These functions are conventional and will not be described further.

While the item equivalent to the soft key 9b is left blank in FIG. 20, it indicates that there is no item corresponding to the soft key 9b on this screen.

The machining of a workpiece using desired tools is conducted on the basis of input NC data, under the control of a program that is assembled in blocks. To create the necessary NC data, the operator selects an "NC DATA CREATING" option from among the options displayed on the CRT display device 7A to activate a program for NC data creation and to load the file of the floppy disk FL into the RAM 3A.

If a block, for which a tool to be used must be specified, has been appropriately programmed during the creation of NC data, the CPU 1A automatically responds to the programming and initiates a "tool specifying processing".

When the tool specifying processing is initiated as seen in FIG. 19, the CPU 1A first displays a message (SPECIFY TOOL) prompting the operator to enter a tool management name or a tool management number on the CRT display device 7A and waits for the operator to select an input mode on the basis of the display in FIG. 21. By controlling the cursor moving keys of the keyboard 5A, the operator moves the cursor 10A on the CRT display device 7A, selects the specifying mode by means of said cursor 10A, then sets the character string for the selected TOOL MANAGEMENT NAME or TOOL MANAGEMENT NUMBER mode by controlling the alphanumeric keys of the keyboard 5A, and enters the character string by depressing the execute key, thereby temporarily storing it into the CPU 1A. Also, the CPU 1A stores which specifying mode, tool management name or tool management number, has been selected according to the position of the cursor 10A. This selection process is identified in step S201A of FIG. 19.

The CPU 1A then judges whether the specifying mode is the TOOL MANAGEMENT NAME mode or not on the basis of the data stored (step S202A). If it is the TOOL MANAGEMENT NAME mode, the CPU 1A searches the file loaded into the RAM 3A on the basis of the character string representing the tool management name entered, i.e. nominal diameter, tool name and material (step S203A), and determines whether or not a tool management name matching the one entered exists in the file (step S204A). If the matching tool management name exists, the CPU 1A reads the tool management number corresponding to that tool management name from the file and writes and stores it into the currently created program (step S205A), then terminates the tool specifying processing and returns to the NC data creation processing.

If it has been determined in the step S204A that the tool management name entered does not exist in the file, the CPU 1A judged it as a tool management name input error, shifts to step S206A, displays on the CRT display device 7A a message prompting the operator to re-enter the tool management name or tool management number, returns to the step S201A, and waits for the tool management name or tool management number to be re-entered.

If it has been determined in the step S202A that the specifying mode does not use the tool management name, it means that the specifying mode is the TOOL MANAGEMENT NUMBER mode. Hence, the CPU 1A searches the file loaded in the RAM 3A on the basis of the tool number entered (step S207A) and determines whether a tool management number matching the one entered exists in the file (step S208A). If the matching tool management number exists, the CPU 1A writes and stores that number into the currently created program (step S205A), then terminates the tool specifying processing and returns to the NC data creation processing.

If it has been determined in the step S208A that the tool management number matching the one entered does not exist in the file, the CPU 1A judges it as a tool management number input error, shifts to step S209, displays on the CRT display device 7A a message prompting the operator to re-enter the tool management name or tool management number, returns to the step S201A, and waits for the tool management name or tool management number to be re-entered.

In such a method, simple tool selection mistakes can be prevented. However as the number of tools employed increases, particularly where many tools of the same type exist, a tool list must be prepared and tools selected on the tool data screen. When the number of tools is large, it still takes a long time to select the most appropriate one from among the many available tools, as previously.

In another conventional system, as disclosed in Japanese Patent Disclosure Publication No. 126303 of 1990, the disadvantage of a fully automatic tool selection system is discussed. In such fully automatic system, tool determination data is first gathered and a tool file containing tool groups organized on the basis of tool determination data is searched. The most appropriate tool group and the most appropriate tool in the group is selected automatically, without operator input. Recognizing that the operator may have substantial know how with regard to tool selection, the disclosed system adds to a fully automated mode an operator determination mode.

FIG. 23, taken from the reference, illustrates the process used in the dual mode operation. First, a selection is made of a tool determination mode (step S1). If the automatic mode is selected, the tool is determined by gathering tool data (step S2), searching for a tool file on the basis of that data (step S3), extracting the most appropriate tool group from memory (step S4), determining the appropriate tool in the group (step S5) and displaying the tool (step S6).

If the operator determination mode is selected, the tool determination data is collected from set machining information (step S7), the tool file including tool groups is searched for a corresponding tool group on the basis of tool determination data (step S8), a decision on the group mode (step S9) and the group is displayed (step S10). The operator refers to the displayed group and selects the most appropriate tool using the keyboard (step S11). The reference suggests that the data for the selected tool may be displayed (step S12) but does not teach the content of such data.

This generic description of the operator selection process does not identify in detail (i) the quantity or identity of the tool selection criteria, (ii) how the tool selection criteria are identified or (iii) whether or how that process may be modified. Where the number of tools from which a selection is to be made becomes very large, the operator still is burdened by the need to select the most appropriate one from many tools.

SUMMARY OF THE INVENTION

It is, accordingly, an object of the present invention to overcome the disadvantages in the background art by providing a tool specifying method in an NC automatic programming system which can specify a tool to be used rapidly and properly.

It is another object of the present invention to provide a tool determining method which selects the most appropriate tool for machining in sequence from among a plurality of tools.

A criterion table is provided to set selection reference data for selecting tools appropriate for each machining, and a machining tool matching data in said criterion table is determined as the most appropriate tool.

When the machining tool is selected, tools are displayed on the screen in the order from the most to least appropriate ones so that the operator is allowed to select the tool.

Tools adequate for each machining are selected from among a plurality of tools and displayed on the screen in

BRIEF DESCRIPTION OF THE DRAWINGS

FIG. 4 is a schematic diagram illustrating a tool data setting screen of the present invention.

FIG. 5 is a schematic diagram illustrating a setting table in a criterion data setting screen of the present invention.

FIG. 7 provides an example of a machining program.

FIG. 15 is a schematic diagram illustrating a criterion data setting table according to another preferred embodiment of the present invention.

FIG. 20 is a schematic diagram illustrating an example of a conventional tool data setting screen.

FIG. 23 is a flowchart illustrating a conventional tool specifying processing using both automatic and operator selection of tools.

DESCRIPTION OF THE PREFERRED EMBODIMENTS

Figure 1:
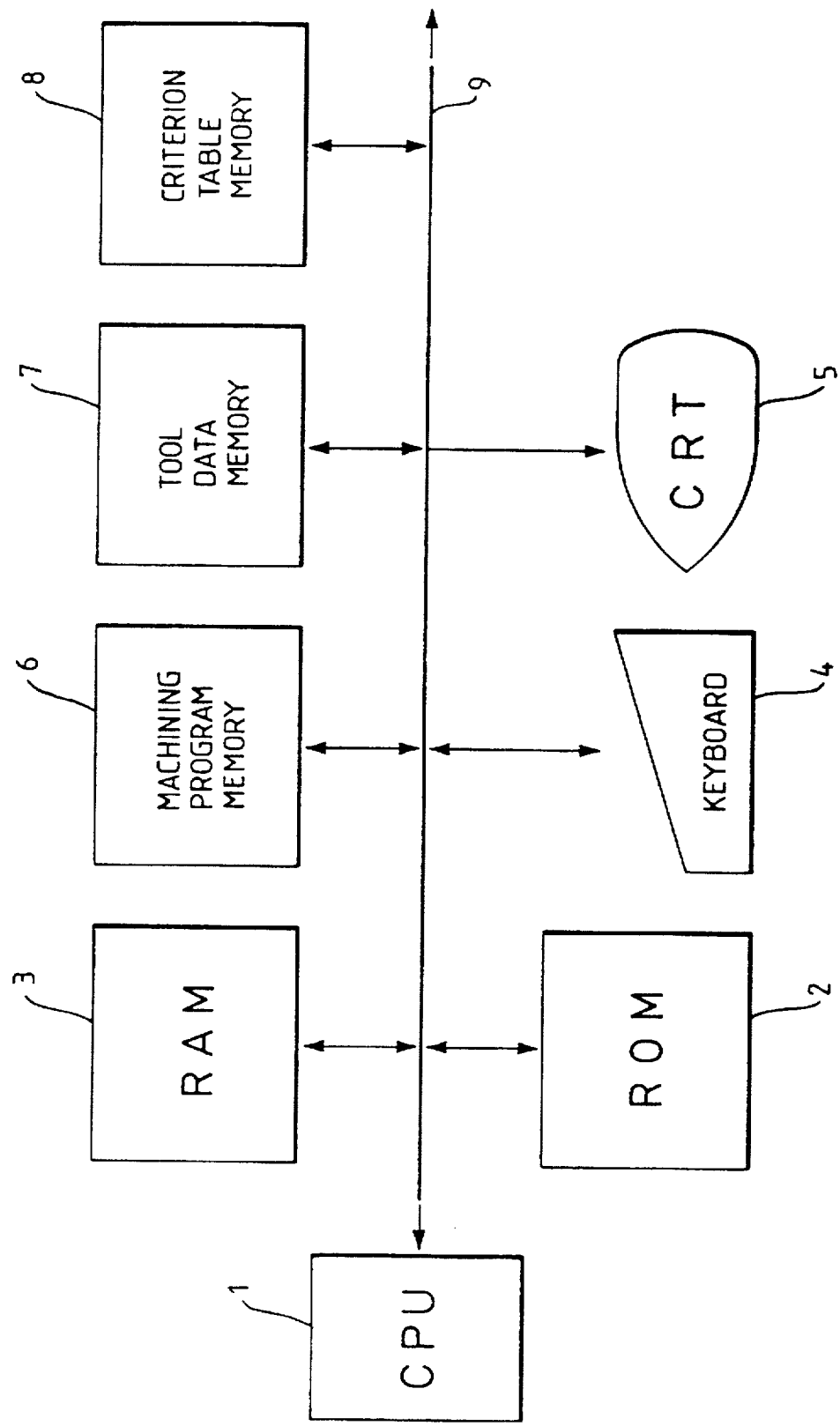
FIG. 1 is a block diagram illustrating the major components of an NC automatic programming unit acting as an automatic programming system for carrying out a method of the presentation.

An embodiment of the present invention will be described with reference to the appended drawings. FIG. 1 is a block diagram showing the main components of an NC automatic programming unit serving as an automatic programming system for executing the method of the present invention, wherein the numeral 1 indicates a processor (hereinafter referred to as the "CPU"), 2 a ROM storing a control program for controlling said automatic programming unit, 3 a RAM acting as storing means for storing various data, the operation processing results of the CPU 1, etc., 4 a keyboard, 5 a CRT display device serving as an interactive screen, 6 a machining program memory for storing NC machining programs created, 7 a tool data memory for storing the data of each tool, and 8 a criterion table memory for storing a criterion table which indicates the basis of selecting the most appropriate tool for each machining. Elements 1 to 8 are connected by a bus line 9.

Figure 2:
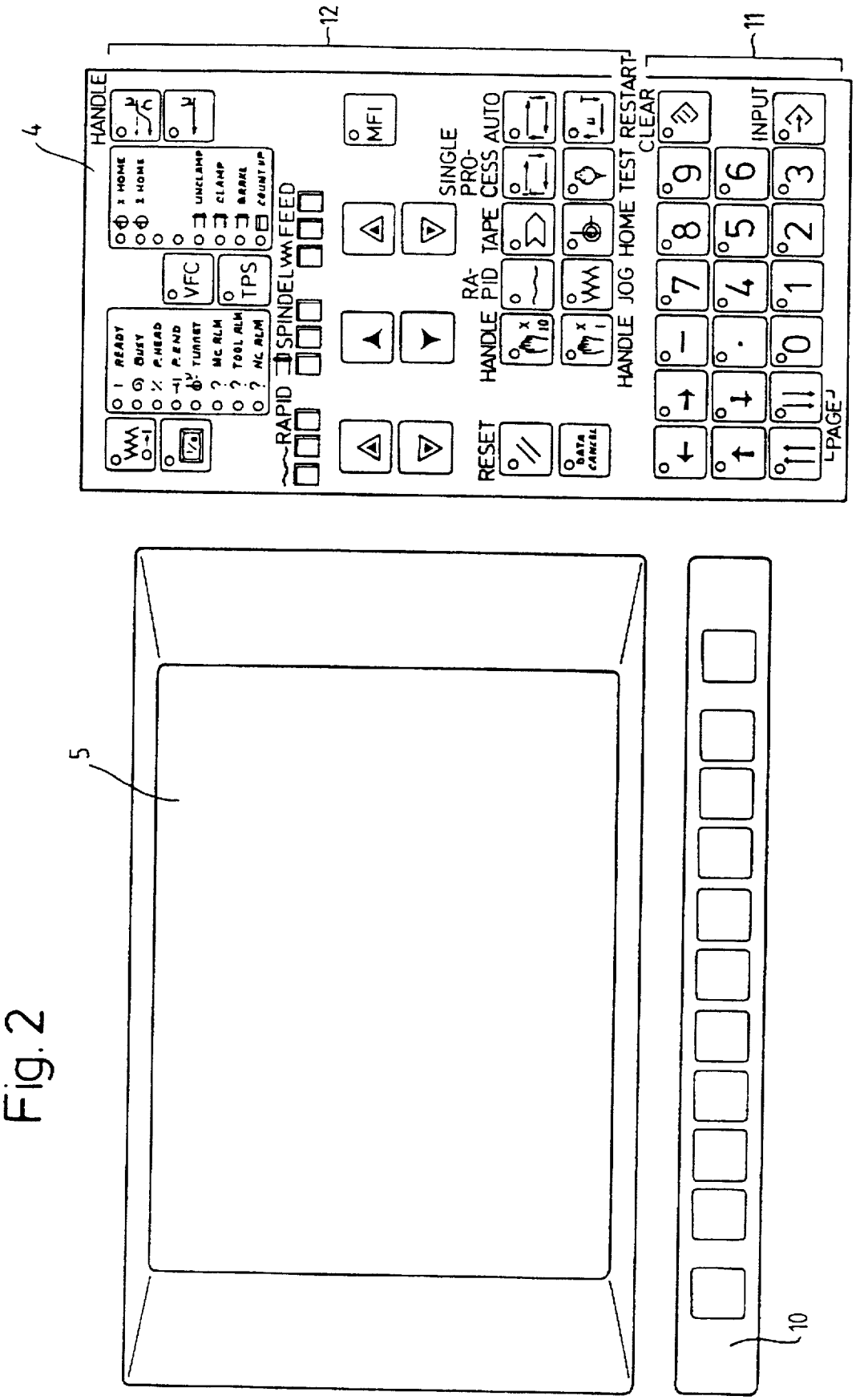
FIG. 2 is a schematic diagram illustrating an operation board of the present invention.

FIG. 2 illustrates an example of an operation board comprising the keyboard 4 and CRT display device 5. The keyboard 4, acting as data entry means, is provided with data setting keys 11 comprising numeric keys (0 to 9), cursor moving keys, an input key (INPUT), a clear key (CLEAR) and screen switching keys, and other various machine control keys 12. The CRT display device 5 has a plurality of menu keys 10 constituting part of the data entry means disposed along the bottom edge of the display screen. The NC automatic programming system contained in the numerical controller, which is indicated in the present embodiment as an example, may be replaced by an offline type NC automatic programming system installed separately from the numerical controller.

Figure 3:
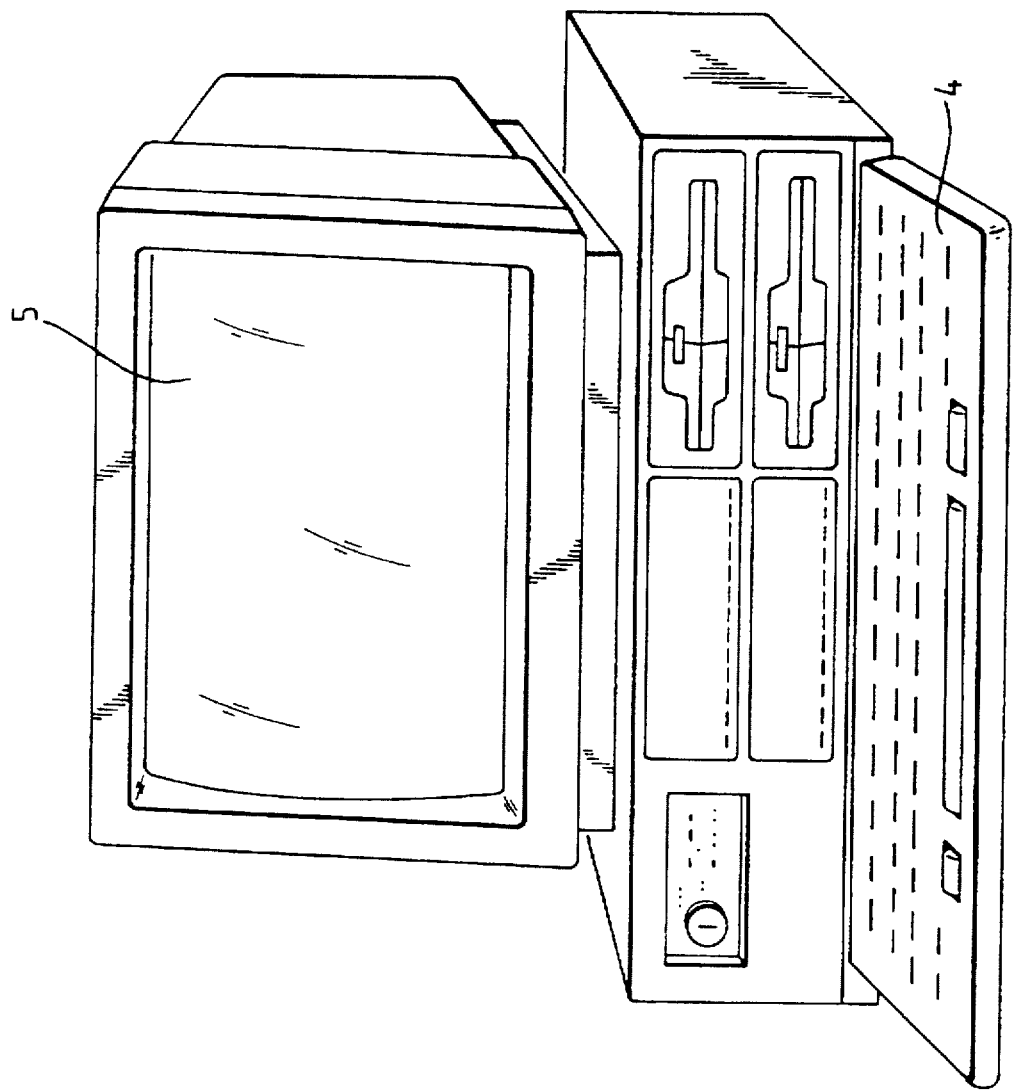
FIG. 3 is an external view of an offline type NC automatic programming system according to another preferred embodiment of the present invention.

The offline NC automatic programming system, comprising a keyboard 4 and a CRT display device 5 as shown in FIG. 3, has the same hardware configuration as generally available work stations or personal computers. In this case, the various machine control keys 12 shown in FIG. 2 are not needed because of an off line system, and the menu keys 10 may be substituted by the function keys on the keyboard 4.

Figure 17:
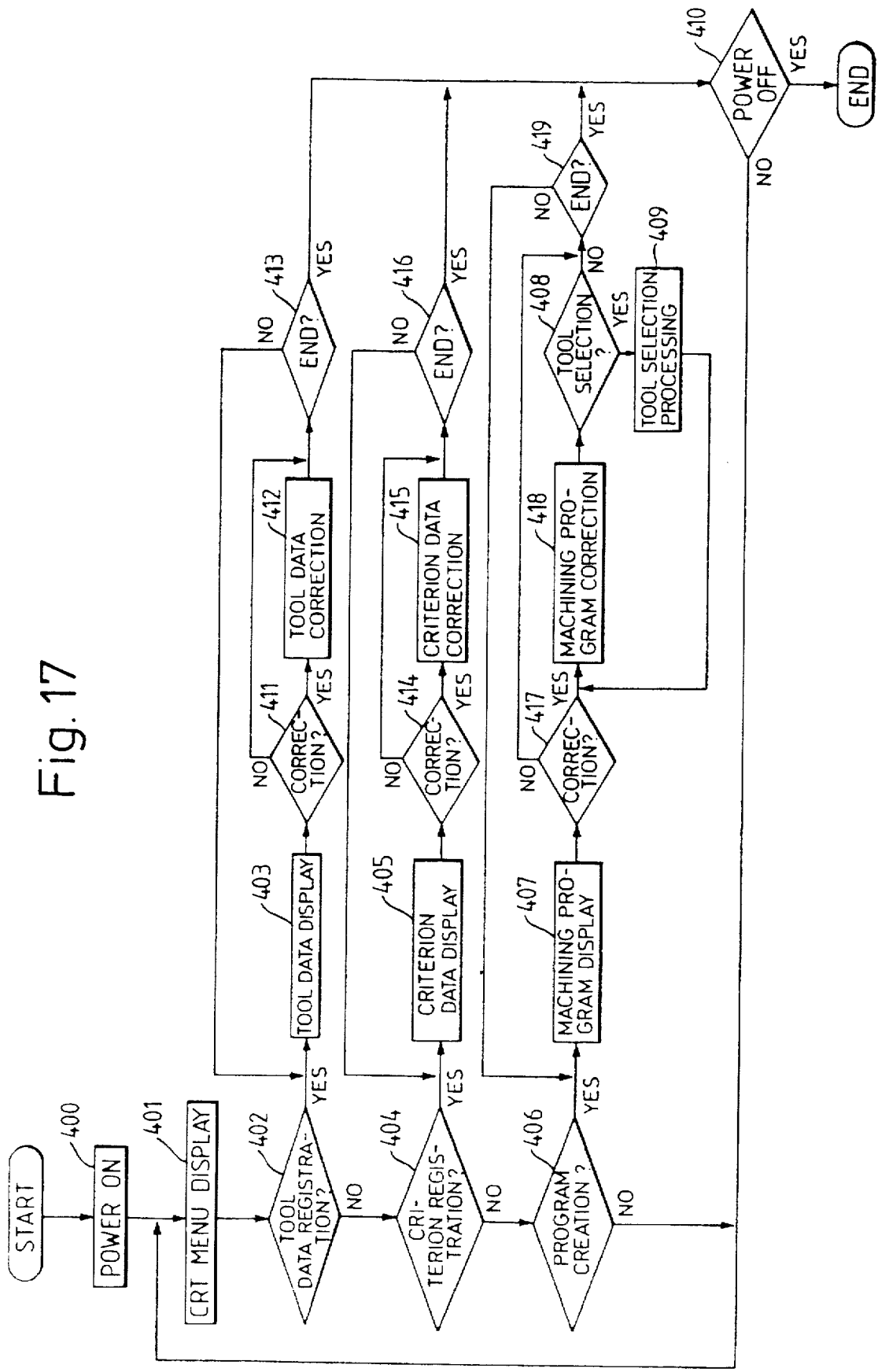
FIG. 17 is a flowchart illustrating a general operating procedure according to the present invention.
Figure 18:
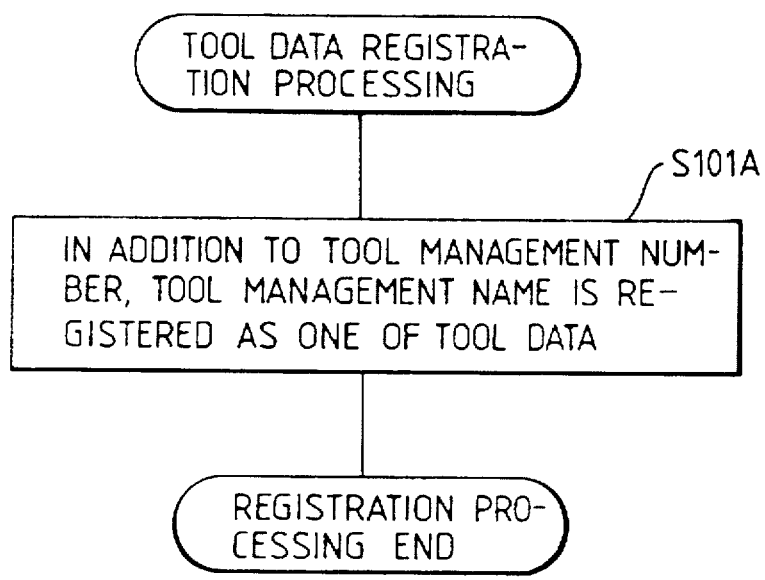
FIG. 18 is a flowchart illustrating conventional tool data register processing.
Figure 19:
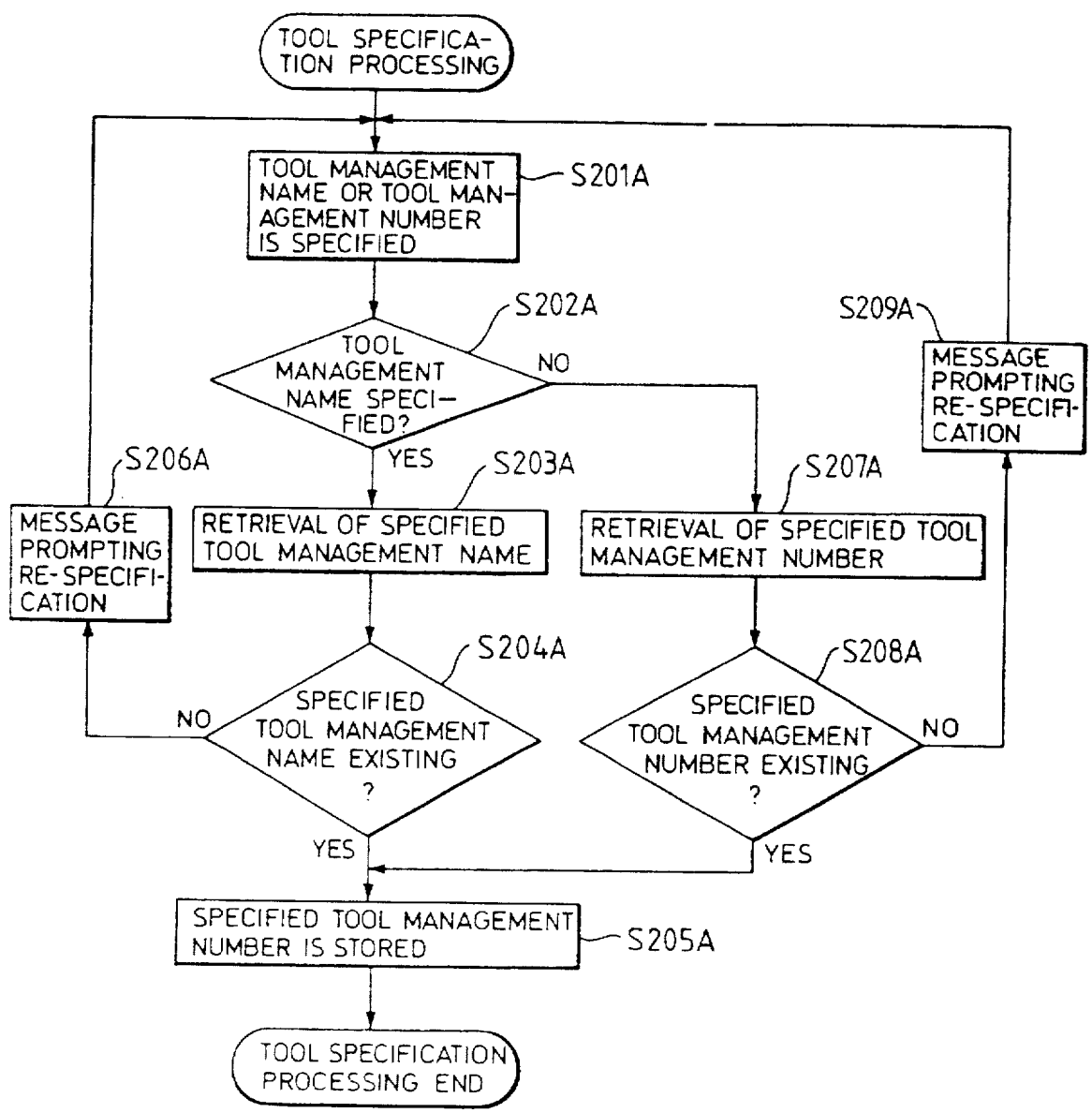
FIG. 19 is a flowchart illustrating conventional tool specifying processing.
Figure 21:
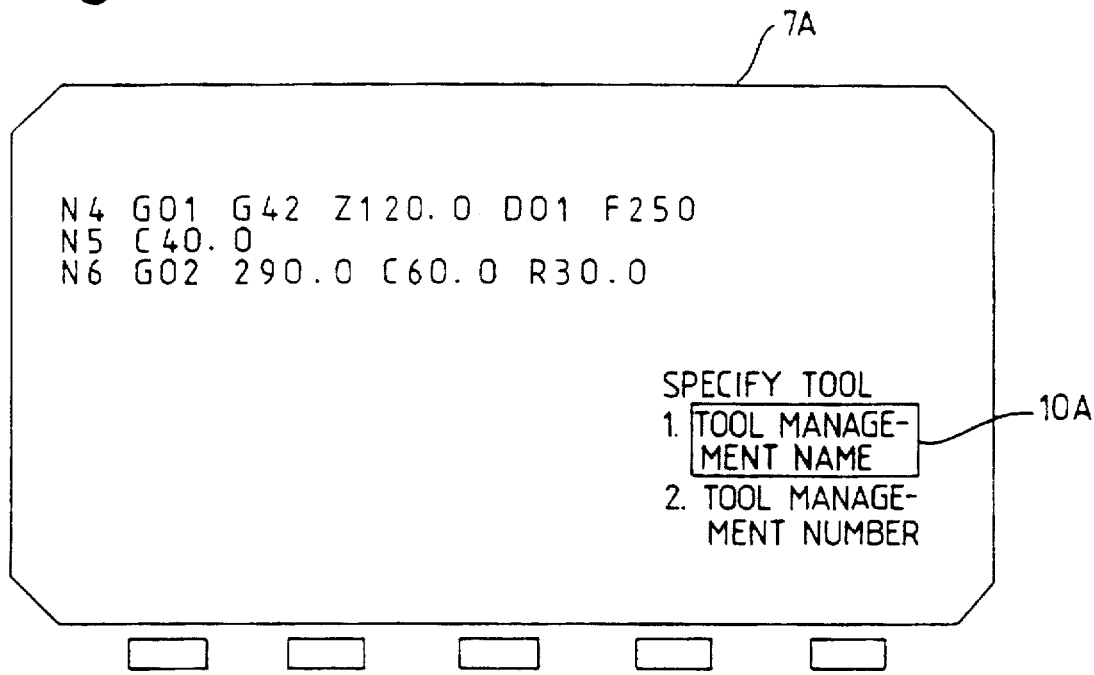
FIG. 21 is a schematic diagram illustrating an example of a display screen in the conventional tool specifying processing.
Figure 22:
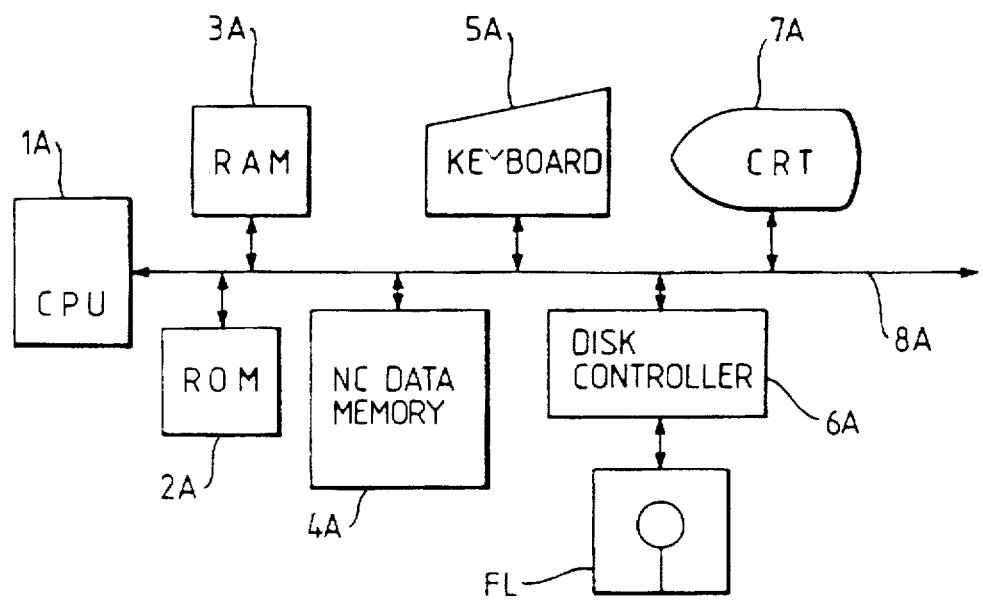
Figure 23:
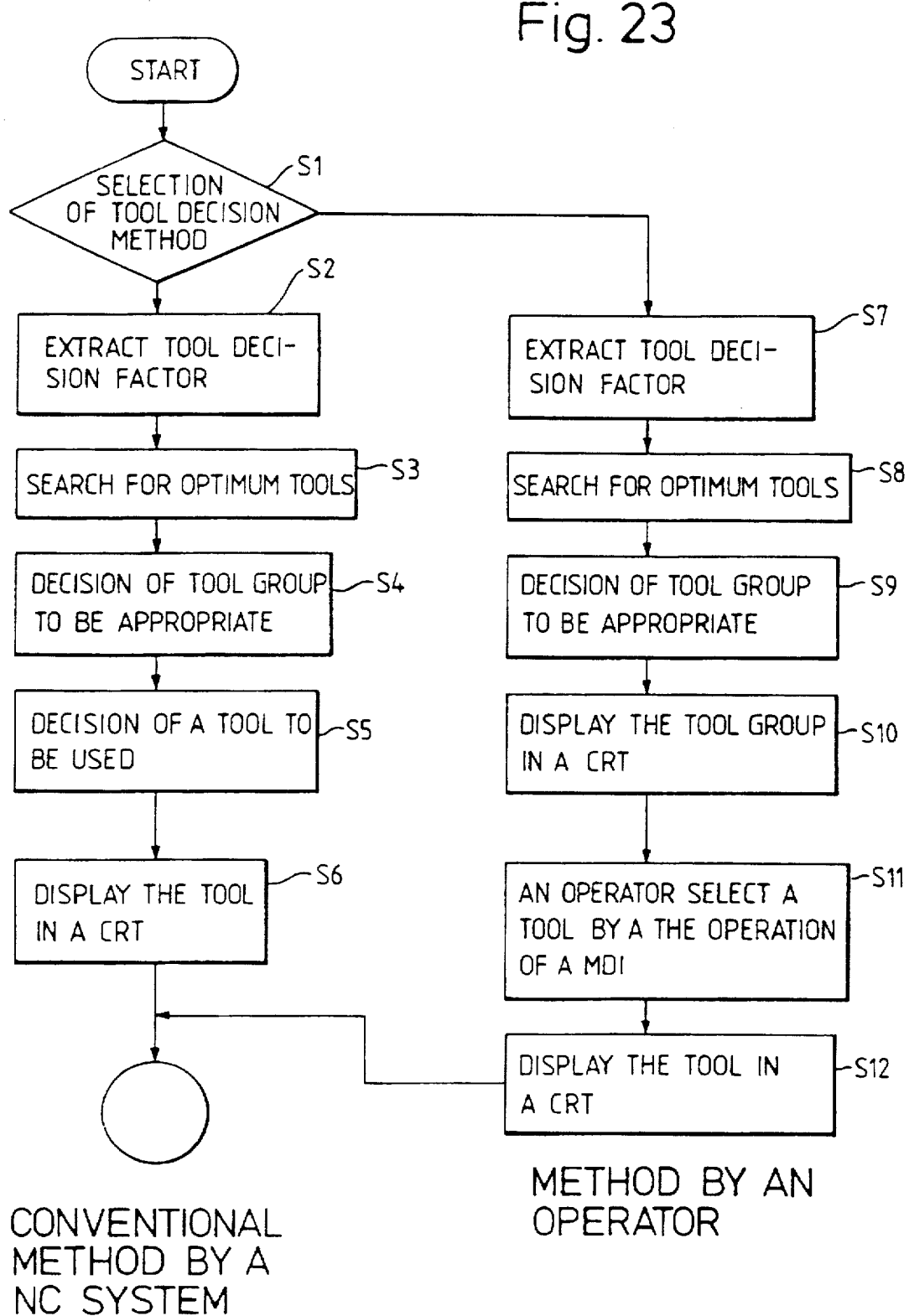
FIG. 23 is a block diagram illustrating the main components of an NC automatic programming unit serving as an automatic programming system for executing a conventional method.

The tool specifying method in the present embodiment will now be described in accordance with a flowchart indicating a general operating procedure of the present invention in FIG. 17.

The operator first powers up the NC automatic programming unit (step 400), and the CPU 1 displays options, which represent processings corresponding to various programs on the basis of the control program stored in the ROM 2, on the CRT display device 5 in an interactive mode (step 401), and waits for the operator to select any option by depressing the corresponding menu key 10.

The operator depresses the required menu key 10 to select the option to be executed.

If a menu for registering tool data is selected (step 402), the CPU 1 switches the display of the CRT display device 5 to a tool data setting screen and displays tool data on the screen (step 403). If it is desired to correct the tool data (step 411), the operator makes tool data correction (step 412). If the display or correction of the tool data is complete (step 413), the processing jumps to step 410. If the operator does not power down the unit in the step 410, the CPU 1 returns to the step 401 and displays the menu.

FIG. 4 is a schematic diagram showing the tool data setting screen. Hereafter, the operator sequentially enters various data indicating tool attributes via the tool data setting screen serving as an interactive screen.

Referring to FIG. 4:

"T No." indicates a tool number.

"SPARE" indicates a spare tool number and is used to specify which tool will replace a tool that has reached its life.

"SHAPE" indicates a tool type and a machined portion.

For turning, for instance, the tool type includes the following:

GNL: general turning tool
GRV: grooving tool
THR: threading tool
DRL: drilling tool
TAP: tap
SPT: special tool
SENSOR: tactile sensor The machined portion includes the following:

OUT: outside diameter machining
IN: inside diameter machining
FCE: end facing

"NOSE R" indicates a tool nose radius or a tool diameter.

"ROTATION/HAND" indicates the direction of rotation of a spindle and the right- or left-handedness of a tool, allowing any of the following options to be selected:

1: forward rotation/right hand
2: reverse rotation/right hand
3: forward rotation/left hand
4: reverse rotation/left hand "GROOVE DEPTH/ENTERING ANGLE" is used to specify the entering angle of a tool, or if a grooving tool is used, to specify the maximum grooving depth.

"NOSE WIDTH/NOSE ANGLE" is used to specify the nose angle of a tool, or if a grooving tool is used, to specify the width of a tool nose.

"CODE NAME" is used to specify the name of a tool.
"HOLDER" is used to specify the type of a tool holder.
"TOOL WIDTH" is used to specify the width of a tool.
"TOOL LENGTH" is used to specify the length of a tool.

12 indicates a screen page when the tool data setting screen comprises a plurality of screens. The numeral 13 indicates a screen mode display representing that this screen is the tool setting screen. 14 indicates a menu display from which a required menu is selected by depressing the corresponding menu key 10.

Now, the operator first moves a cursor 15 of the CRT display device 5 to the position of a required item by controlling the cursor moving keys of the keyboard 4, and enters the required data from the keys on the keyboard 4.

The operator thus enters data on all tools loaded on the machine tool. Tool data 7a thus entered is all stored into the tool data memory 7 shown in FIG. 1. Once set, the tool data 7a need not be set unless any tool loaded on the machine tool is replaced.

If a menu for registering criterion data is then selected (step 404), the CPU 1 switches the display of the CRT display device 5 to a criterion data setting screen and displays criterion data on the screen (step 405). If it is desired to correct the criterion data (step 414), the operator makes criterion data correction (step 415), if the display or correction of the criterion data is complete (step 416), the processing jumps to the step 410.

FIG. 5 is a schematic diagram showing a setting table in the criterion data setting screen. Hereafter, the operator sequentially enters various data indicating the selection reference data of tools via the criterion data setting screen acting as an interactive screen.

Referring to FIG. 5:

"MACHINING MODE" indicates a machining type and a machined portion.

For turning, for example, the machining type includes the following:

BAR: bar work process
CPY: copying process
CNR: corner rounding process
EDG: end facing process
THR: threading process
GRV: grooving process
DRL: drilling process
TAP: tapping process
MES: measuring process The machined portion includes the following:

OUT: outside diameter machining
IN: inside diameter machining
FCE: end facing

"DIVISION" differentiates between roughing (R) and finishing (F). When there are roughing and finishing in the machining mode, criteria are set separately for roughing and finishing.

"TOOL TYPE 1", "TOOL TYPE 2" and "TOOL TYPE 3" are used to specify the most appropriate tool types and machined portions in each machining mode. The tool types and machined portions are identical to those of "SHAPE" described in FIG. 4. Selection priority is given in order of tool types 1, 2 and 3. Ordinarily in one machining mode, only one tool type is appropriate for machining. However, if the tool type 1 does not exist and the tool type 2 or 3 may be used instead, the tool types 2 and 3 are specified. Where there are no replaceable tools, the tool types 2 and 3 are left blank.

"CONDITION 1" to "CONDITION 6" are used to specify conditions to be satisfied by the tools to be selected for those specified in the tool types. Tool selection is made with priority given in order of conditions 1, 2, 3, 4, 5 and 6. Namely, tools satisfying the condition 2 are selected from among those satisfying the condition 1, and further tools satisfying the condition 3 are selected from such tools. Where there are fewer than six conditions to be set, any unset conditions are left blank.

The conditions to be set are as follows:

R: nose radius
K: rotation/hand
A: groove depth/entering angle
B: nose width/nose angle
H: holder
W: tool width
L: tool length These conditions are employed to specify which of the data shown in FIG. 4 is used to select the most appropriate tool.

A value following any of R, K, A, B, H, W and L indicates a criterion. A condition of a:b indicates that a tool having a value within the range a to b is selected. When there are a plurality of tools that satisfy this condition, tool selection is performed in the order from a to b. The magnitude relationship of a and b may either be a>b or a<b. If a>b, the tools are selected in descending order, and if a<b, they are selected in ascending order, i.e. a is the most appropriate value and the permissible value is up to b.

For example, R0.2:* indicates that the tool to be selected has the nose radius value of not less than 0.2 mm and selection is made in order of tools whose nose radius value is closer to 0.2 mm. "*" indicates the maximum value. Although the maximum value usually indicates the largest value among data set as the tool data, it should indicate the value of a groove width to be machined when "*" is specified in the nose width data of "B" in the grooving mode. Also, when "*" is specified in the tool width data of "W" in the drilling mode, the maximum value should indicate the value of a hole diameter to be drilled. In this manner, the value of "*" may be the maximum machinable value according to the machining mode.

R*:0.2 indicates that the tool to be selected has the nose radius value of not less than 0.2 mm and selection is made in order of tools whose nose radius values are larger.

As described in the case of the tool data, the operator moves the cursor 15 to the position of a required item by controlling the cursor moving keys of the keyboard 4, and enters the required data from the keys on the keyboard 4.

The criterion data thus entered is all stored into the criterion table memory 8 shown in FIG. 1. Once set, the criterion data need not be reset unless the criteria are changed.

When creating an NC machining program, the operator selects an NC machining program creation menu from among the options displayed on the CRT display device 5 (step 406). The CPU 1 then switches the display of the CRT display device 5 to an NC machining program display screen and displays an NC machining program on the screen (step 407). If it is desired to correct the NC machining program, the operator makes NC machining program correction (step 418). If the display or correction of the machining program is complete (step 419), the processing jumps to the step 410.

Figure 6:
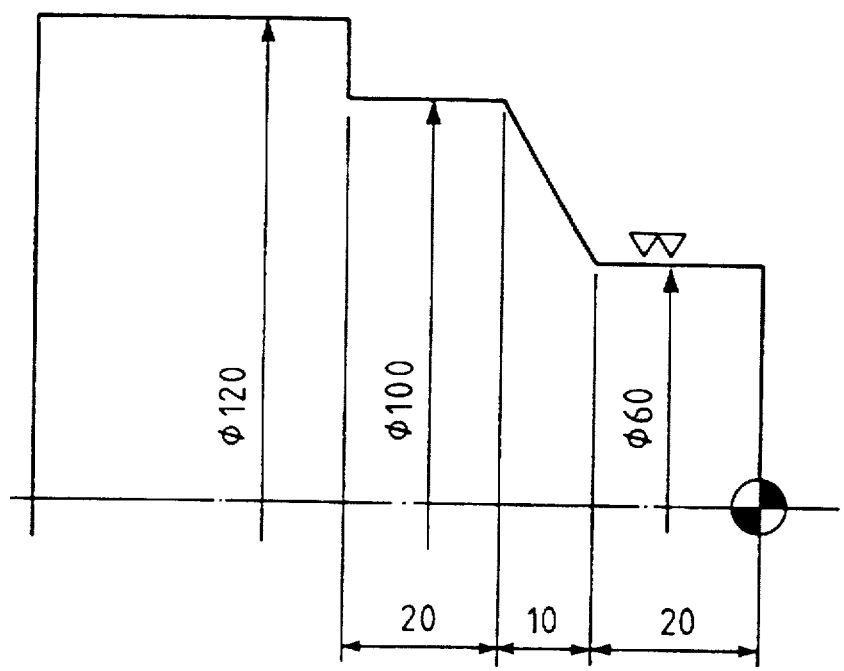
FIG. 6 provides an example of a machining drawing.

In creating or correcting the NC machining program, the operator enters the NC machining program on the basis of a machining drawing as shown in FIG. 6 via an NC machining program edit screen serving as an interactive screen (step 407).

FIG. 7 shows a machining program thus entered on the basis of the machining drawing shown in FIG. 6. "P No." indicates a process number which is incremented in sequence, beginning with 0. The process number of "0" is used to specify the data of stock, and "MATERIAL" indicates the material of the stock, "OD" the maximum outside diameter of the stock, "ID" the minimum inside diameter of the stock, and "STOCK LENGTH" the overall length of the stock. The process numbers from "1" onward each indicate the machining processes and comprise one-line process data which defines each machining and multi-line sequence data (SEQ) which defines a machining shape. A tool used in the corresponding process is defined in the process data. "R TOOL" is employed to specify a tool used for roughing and "F TOOL" to specify a tool used for finishing.

Figure 8:
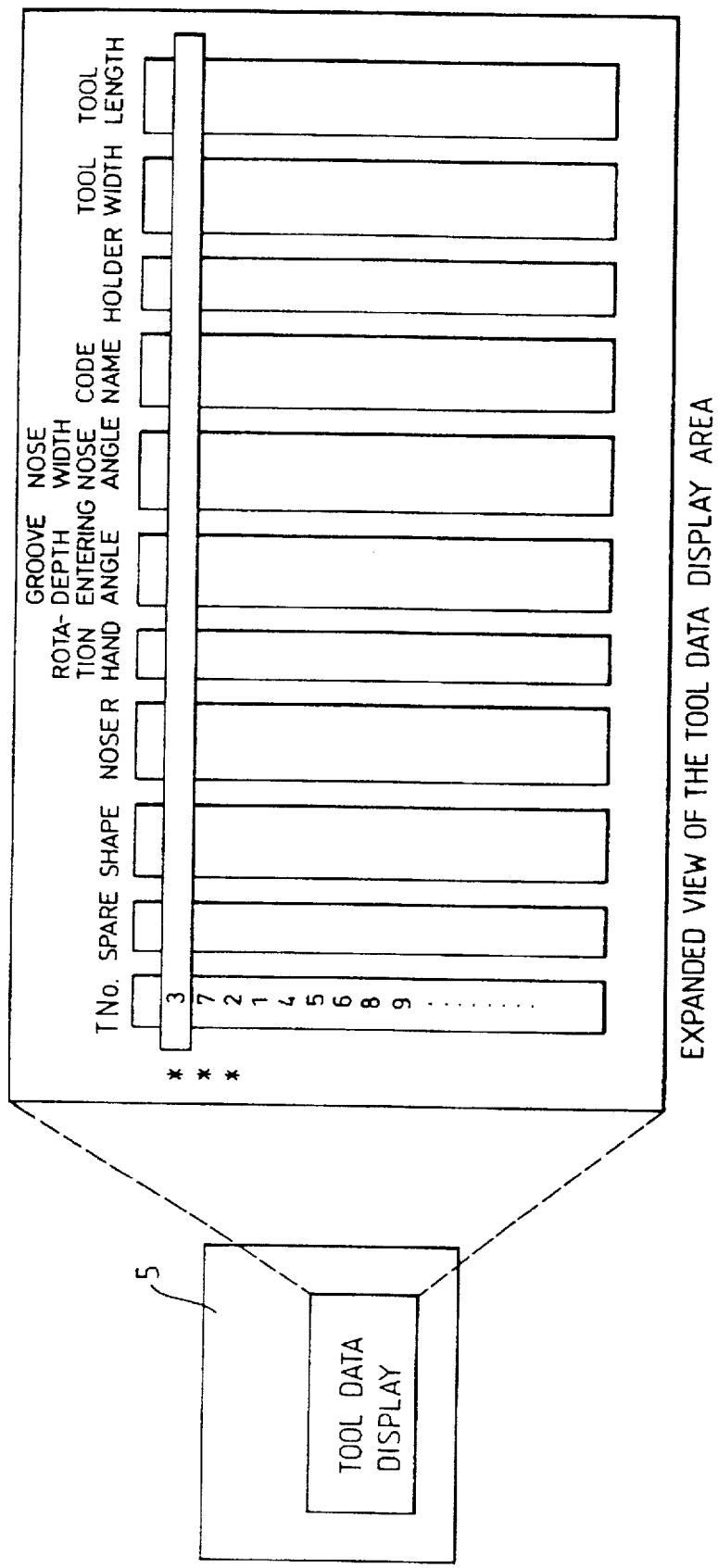
FIG. 8 provides a display example of tool data according to the present invention.

When the cursor 15 has reached a position requiring a tool to be specified, i.e. when the cursor 15 has come to the position of R TOOL (tool used for roughing) or F TOOL (tool used for finishing) in FIG. 7, during the creation of the NC machining program and the operator depresses the "TOOL SELECT" menu key (not shown) (step 408), automatic tool selection is performed and the tools appropriate for the machining are displayed on the CRT display device 5 as shown in FIG. 8 in the order in which they seem to be more appropriate (step 409).

The tools are displayed on the screen in the order in which they seem to be more appropriate on the basis of the criteria. The top tool number in T No. is highlighted, indicating that it is the tool judged as the most appropriate for the corresponding machining. If the system-selected tool is satisfactory, the operator depress the "INPUT" key which means that the tool is acknowledged. This causes the highlighted tool to be entered as the "R TOOL" or "F TOOL" data.

If the operator does not desire to select the most appropriate tool selected by the system, i.e. highlighted tool, the operator moves the cursor to the position of the tool desired to be highlighted by depressing the cursor moving keys, and depresses the "INPUT" key. This allows the tool other than the system-selected, most appropriate tool to be selected.

Figure 9:
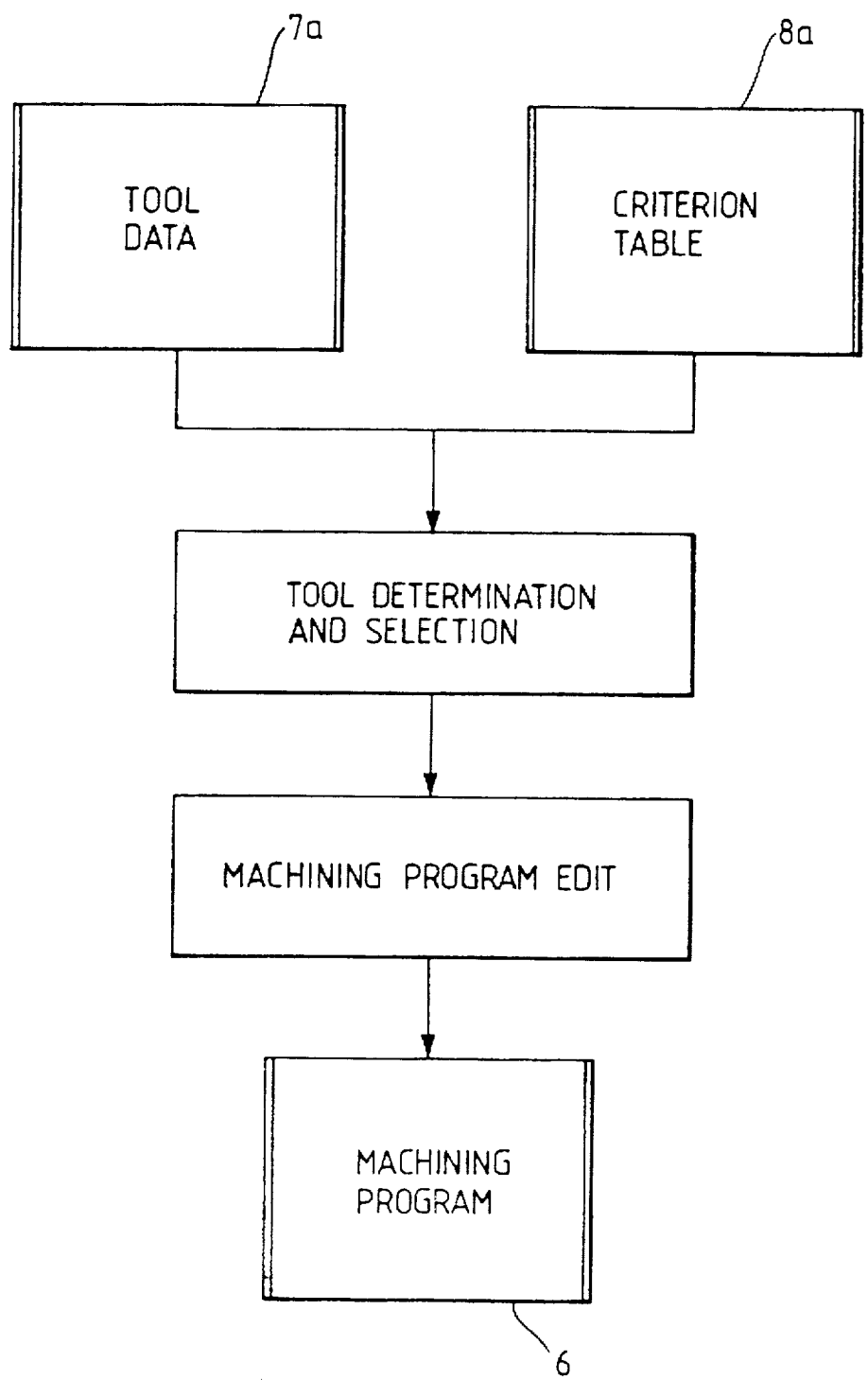
FIG. 9 is a main tool selection block diagram according to the present invention.

FIG. 9 is a tool selection block diagram. To cause a tool to be automatically selected during the edition of an NC machining program 6, appropriate tools are determined in accordance with the tool data 7a and criterion table 8a and displayed on the screen in order of appropriateness, from which the operator is prompted to select.

Figure 10:
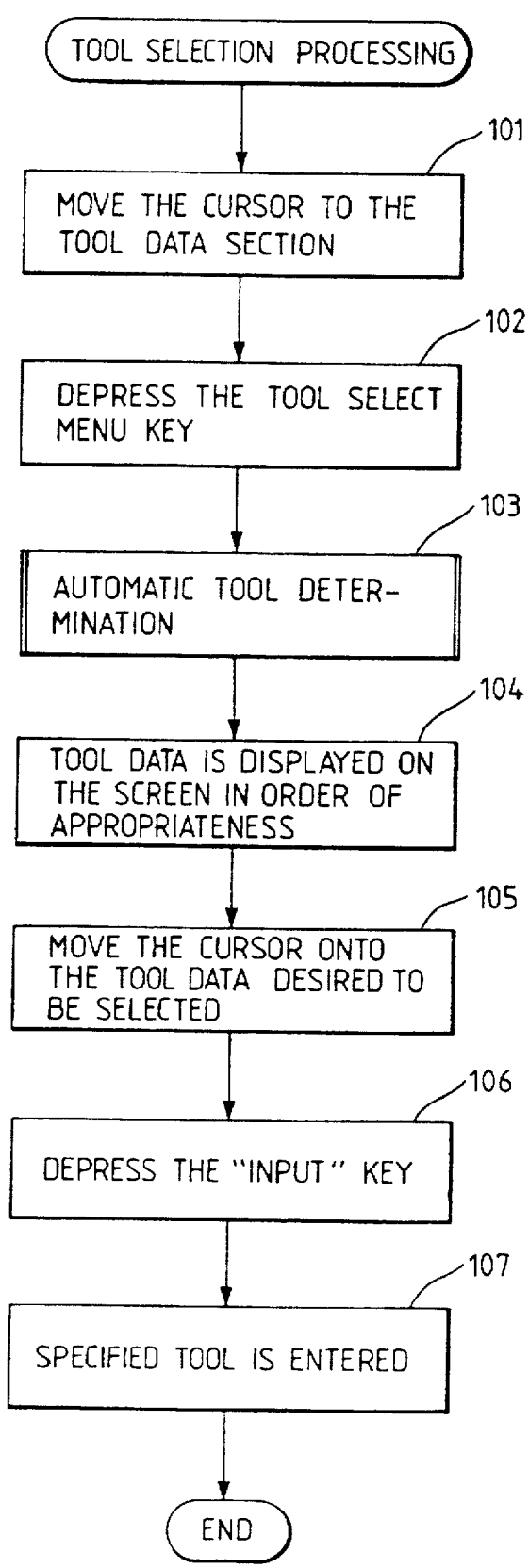
FIG. 10 is a flowchart illustrating tool selection processing according to the present invention.

The processing wherein the operator makes tool selection will now be described with reference to a general tool selection flowchart shown in FIG. 10. The operator creates the NC machining program by entering the data of the NC machining program shown in FIG. 7 from the keys on the keyboard 4 on the basis of the machining drawing shown in FIG. 6. At this time, the cursor is displayed (not shown) at a data input position on the CRT display device 5. When this cursor is at a tool data setting position (i.e. "R TOOL" or "F TOOL" position in FIG. 7) (step 101), depressing the "TOOL SELECT", menu key (step 102) causes automatic tool determination to be started (step 103). The tool determination method will be detailed later. If the tool number to be specified is known beforehand, that tool number (T No.) may be directly entered and set as data from the keyboard 4. In this case, the automatic tool determination is not carried out.

When the automatic tool determination is complete, tool data is displayed on the CRT display device 5 in order of appropriate tools (step 104). At this time, the tool data which seems to be the most appropriate is highlighted as shown in FIG. 8. By depressing the input key (INPUT) in that state, that tool number is set. The tool data is displayed in the order in which the tools seem to be more appropriate, and the tool data conforming to the criterion conditions 1 to 6 is marked "*" so that it may be differentiated from the other tools.

For the tools that do not conform to the conditions, their tool data is displayed next to the tools satisfying the criteria in order of tool numbers. In the example of FIG. 8, the tool numbers (T No.) of the tools conforming to the conditions are 3, 7 and 2 and are marked "*" indicating that they are conforming. The conforming tools are displayed in order of conformance and the tool 3 seeming to be the most appropriate is highlighted. The non-conforming tools are displayed in order of tool numbers (1, 4, 5, 6, 8, 9, ...) without the conforming tools.

Then, the operator shifts the highlight by depressing the cursor moving keys on the keyboard 4 so that the tool data desired to be selected is highlighted (step 105). When the tool data to be selected has been highlighted, the operator depresses the input key (INPUT) (step 106). The highlighted tool is then selected and its tool number is entered as the tool data (step 107).

Figure 11:
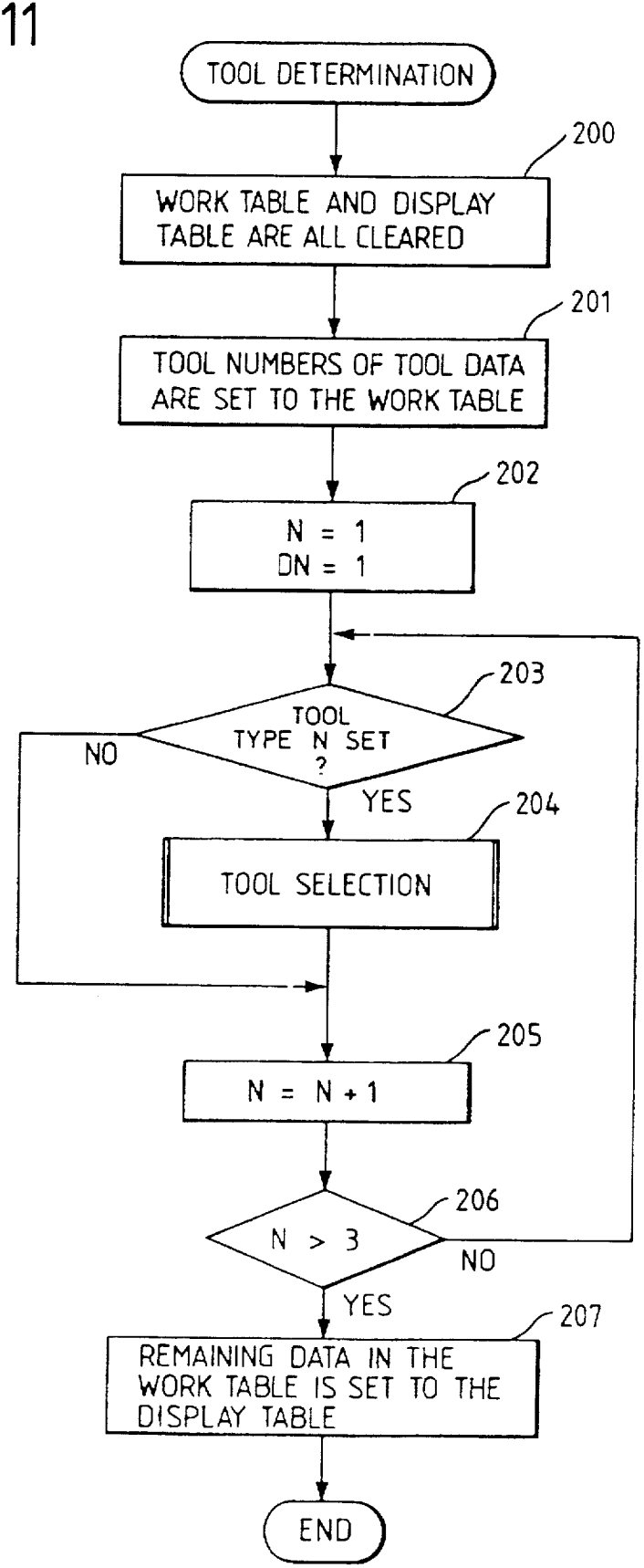
FIG. 11 is a flowchart illustrating tool determination processing according to the present invention.
Figure 12:
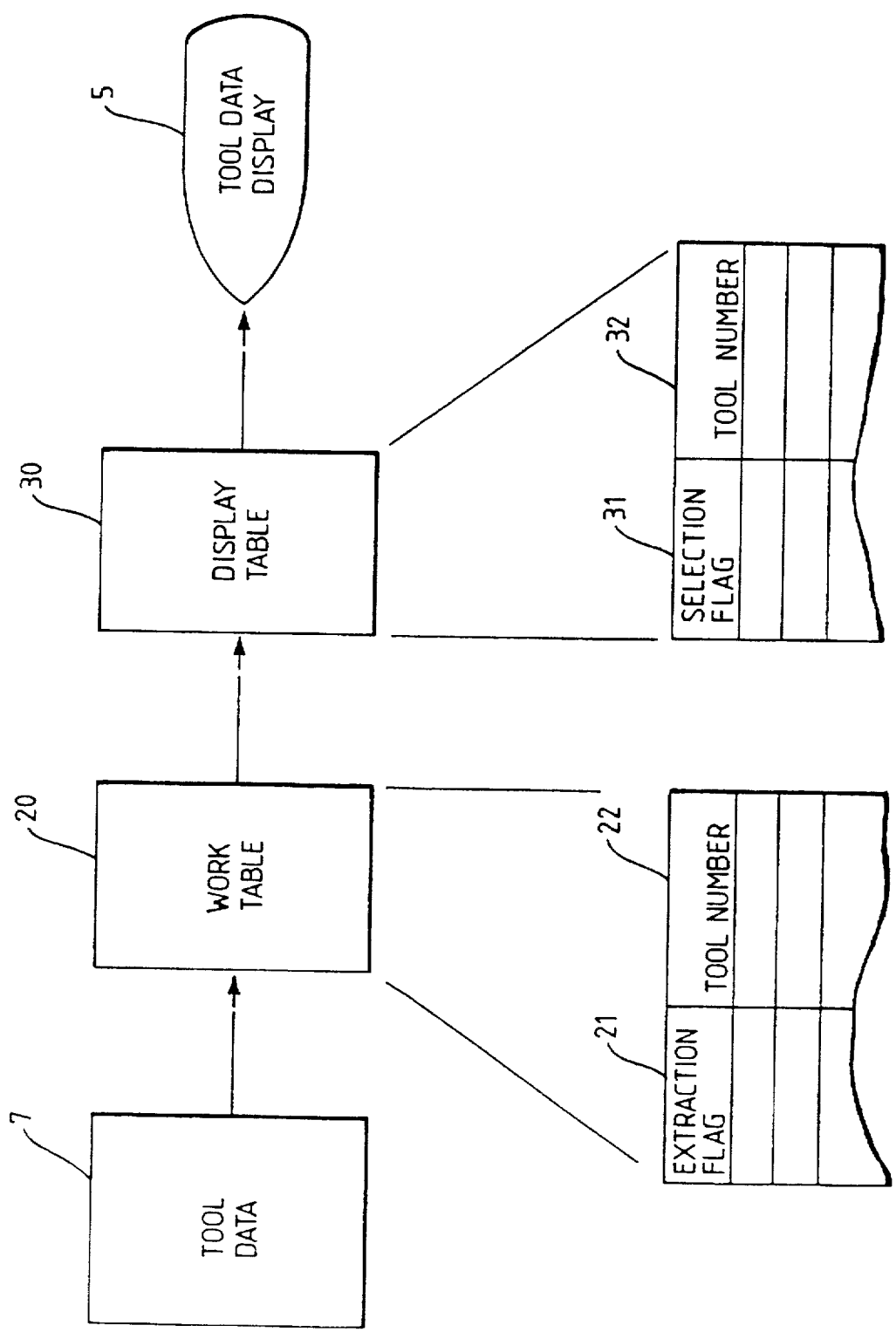
FIG. 12 illustrates processing for tool selection according to the present invention.

The tool determination method will now be described with reference to a flowchart in FIG. 11 and structure of FIG. 12. First, a work table 20 and a display table 30 are all cleared (step 200). The work table 20 consists of extraction flags 21 indicating extracted tools and tool numbers 22 as shown in a diagram illustrating the processing for tool selection in FIG. 12, and has a sufficient capacity to store the data of all tools. The display table 30 consists of selection flags 31 indicating selected tools and tool numbers 32 as shown in FIG. 12, and has a sufficient capacity to store the data of all tools.

The tool numbers of all tools in the tool data 7a are then set in order of tool numbers 22 in the work table 20 (step 201). Since the data in the tool data 7a is arranged in order of tool numbers, the data of the work table 20 is also arranged in order of tool numbers.

Variables N and DN are initialized (step 202). The variable N indicates a tool type number (1 to 3) shown in FIG. 5 and the variable DN indicates a data setting position in the display table 30. It is determined whether the data of the tool type N has already been set (step 203). If it has been set, the processing progresses to step 204. If not yet set, the processing jumps to step 205.

The tools satisfying the conditions shown in FIG. 5 are then selected (step 204). The selection method will be described later in detail. This step selects the tools of which types have been specified in the tool type N appropriate for the machining mode of the machining program, where tool data is to be set, and which satisfy the conditions 1 to 6.

The value of N is then incremented by 1 (step 205). It is determined whether the N value has exceeded 3 or not (step 206). If it has not yet exceeded 3, the processing is repeated, beginning with the step 203. If it has exceeded 3, the judgement on all the tool types 1 to 3 is complete and the remaining data in the work table 20, i.e. the tools that did not satisfy the conditions shown in FIG. 5, are set to the display table 30 in sequence (step 207).

The tools that did not satisfy the conditions are data of which extraction flags 21 in the work table 20 in FIG. 12 are OFF. These tools are set to the display table 30 in order of tool numbers.

Figure 13:
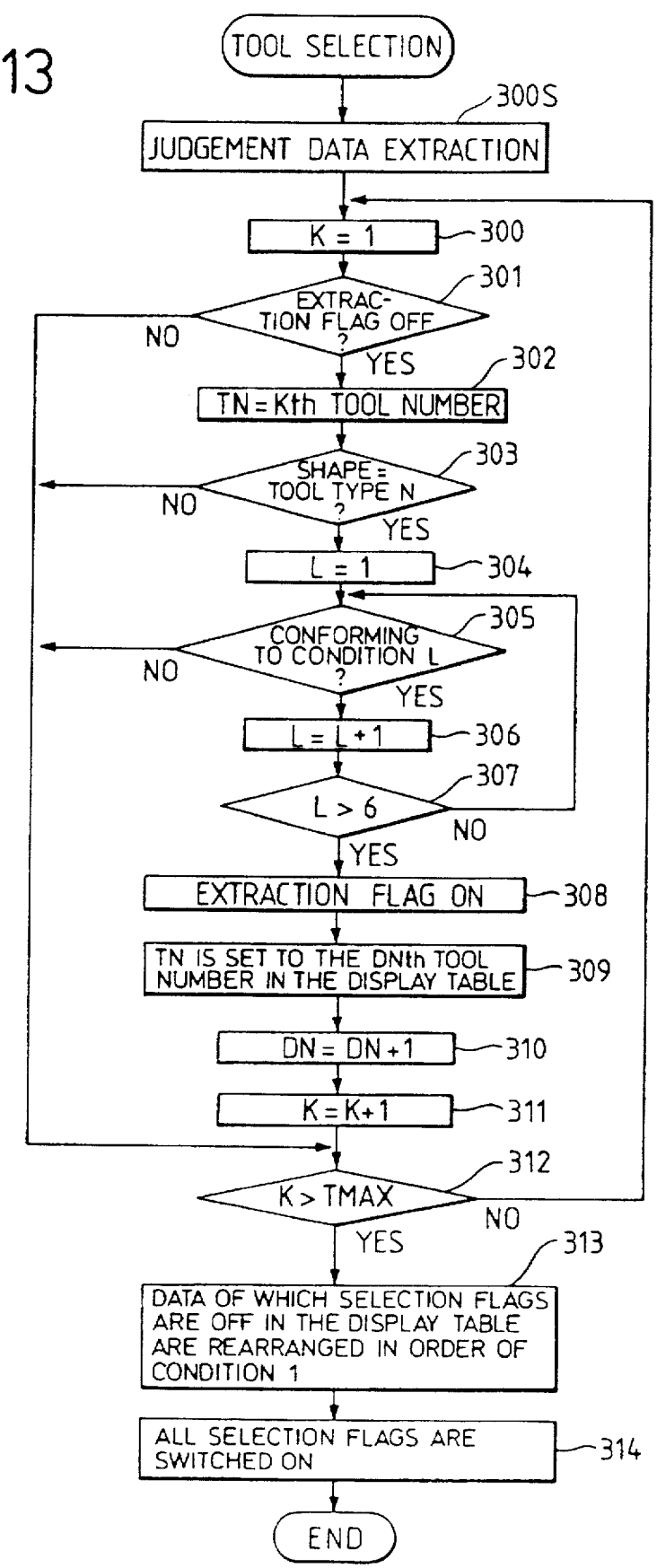
FIG. 13 is a flowchart illustrating tool determination processing according to the present invention.

The tool selection method in the step 203 will now be described with reference to a flowchart shown in FIG. 13.

The data to be judged is extracted from the criterion table 8a (step 300a). Since the machining mode has already been set in the "MODE" data in the process data specified in the machining program, the data to be judged is extracted in accordance with the machining mode and the machining division (roughing or finishing) in the tool data.

In FIG. 7, for example, assuming that tool selection is made with the cursor 15 located in the position of "R TOOL," since data "BAR-OUT" has already been set in "MODE," the data of which "MACHINING MODE" is "BAR-OUT" and "DIVISION" is "R" in the criterion table 8a in FIG. 5 is extracted and defined as tool judgement reference data.

Variable K is initialized (step 300). The variable K indicates the position of data in the work table 20.

It is judged whether the extraction flag 21 of the Kth data in the work table 20 is OFF or not (step 301). If it is OFF, the processing advances to step 302. If it is ON, the processing jumps to step 311.

The tool number TN of the Kth data in the work table 20 is extracted (step 302).

It is determined whether the shape of the data equivalent to the tool number TN of the tool data 7a is the tool type N or not (step 303). If they match, the processing moves on to step 304. If they do not match, the processing jumps to the step 311.

Variable L is initialized (step 304). The variable L indicates the condition number of the conditions 1 to 6.

It is judged whether the tool having the tool number TN conforms to the condition L (step 305). If it conforms, the processing proceeds to step 306. If not, the processing jumps to the step 311. The value of the variable L is incremented by 1 (step 306).

It is determined whether the value of the variable L has exceeded 6 (step 307). If it is 6 or less, the processing is repeated from the step 305 onward. If it is over 6, all the conditions 1 to 6 are regarded as satisfied and the processing advances to step 308.

The extraction flag 21 in the work table 20 is switched ON (step 308).

The value of TN is set to the DNth tool number 32 in the display table 30 (step 309).

The value of the variable DN is incremented by 1 (step 310).

The value of the variable K is incremented by 1 (step 311).

It is determined whether or not the value of the variable K has exceeded the value of TMAX indicating the number of tools (step 312). If TMAX has not been exceeded, it is regarded that there are unjudged tools and the processing is repeated from the step 301 onward. If TMAX has been exceeded, the processing progresses to step 313.

Among the data stored in the display table 30, the data of which selection flags 31 are OFF are rearranged in order of condition 1 (step 313).

Then, in regards to the already set data of the display table 30, all the selection flags are switched ON (step 314).

Figure 14:
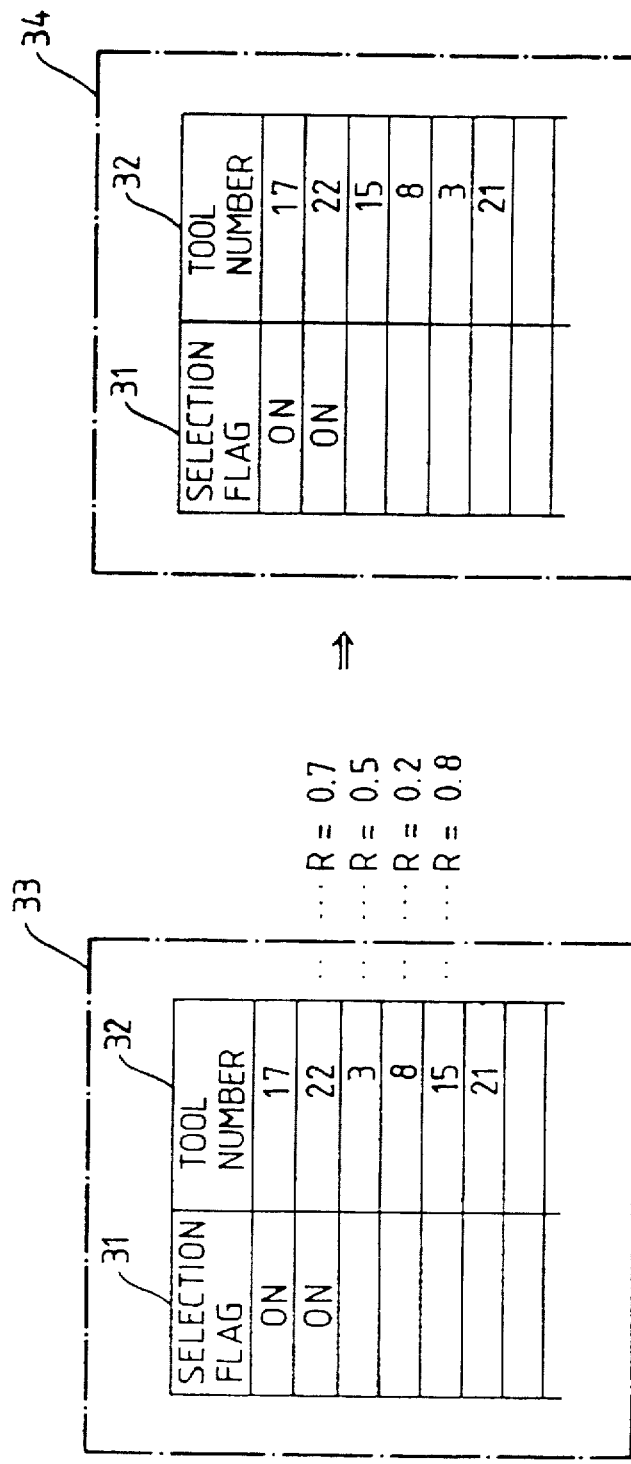
FIG. 14 illustrates processing for tool determination according to present invention.

Namely, as shown in FIG. 14, for example, this is to change the data indicated on the left-hand side 33 in FIG. 14 to that indicated on the right-hand side 34.

Referring to FIG. 14, assume that the nose radius values of the tools are as follows, with the data of the tool numbers 3, 8, 15 and 21 added as indicated on the left-hand side 33:

| Tool Number | Nose Radius Value |
| --- | --- |
| 3 | 0.7 |
| 8 | 0.5 |
| 15 | 0.2 |
| 21 | 0.8 |

If R0.2:* has been specified in the condition 1, i.e. it is has been specified to arrange the tool numbers in the order in which their nose radius values are closer to 0.2, the tool numbers satisfying this condition are rearranged in order of:
15, 8, 3, 21
and the selection flags 31 of these data are switched ON.

Whereas are three tool types, 1 to 3, and six conditions, 1 to 6, in the tool selection criterion table 8 in the present embodiment, these numbers may be changed as required.

Also, while all of the tool types 1 to 3 are judged by the conditions 1 to 6 in the present embodiment, the conditions may be set individually to each tool type as shown in FIG. 15.

In this case, the first tool type appropriate for the "BAR-FCE" machining mode is: "GNL-FCE" and its selection conditions are:
a1 to a6.
The second appropriate tool type is:
"GNL-OUT"
and its selection conditions are:
b1 to b6.

Figure 16A:
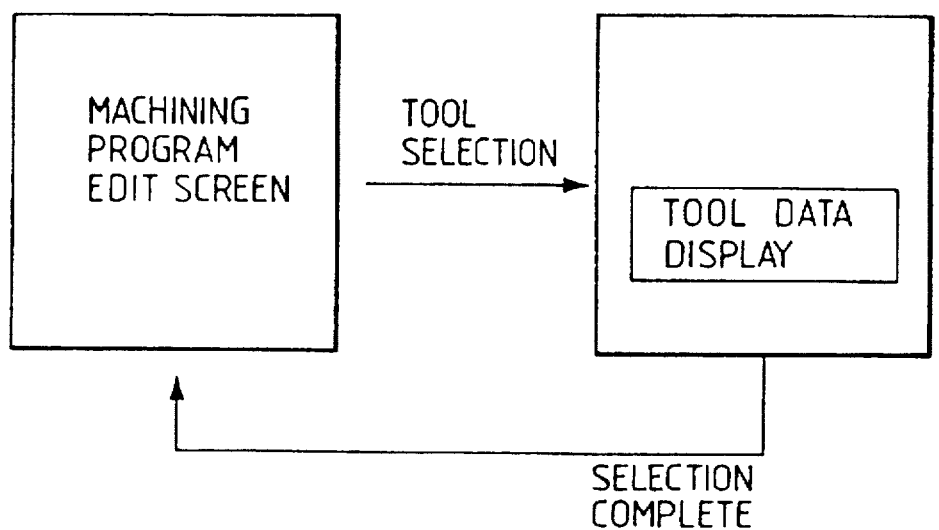
FIGS. 16(A) and 16(B) illustrate tool data display according to the present invention.
Figure 16B:
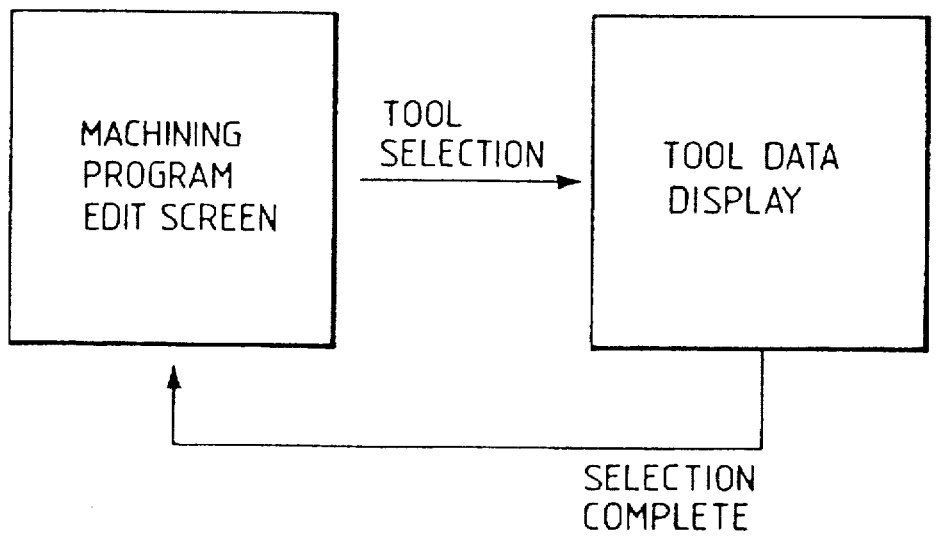

For the display of the tools selected, while the tool data is displayed in a window provided in some part of the screen as shown in FIG. 16(A) in the present embodiment, the entire screen may be switched as shown in FIG. 16(B).

Whereas the machining modes and tool data for turning machines, such as lathes, are indicated in the present embodiment, the present embodiment is also applicable to machining centers, etc.

The "*" marks employed in the present embodiment to differentiate between the tools satisfying the criteria and the other tools may be replaced by other marks. In addition, this differentiation may be made in another method, e.g. the tools satisfying the criteria may be displayed in a different color or the tools satisfying the criteria and the other tools may be displayed in separate positions.

Also, while the data of the tool judged as the most appropriate is highlighted in the present embodiment, it may be displayed in another way, e.g. the most appropriate tool may be indicated by the cursor or only the most appropriate tool may be displayed in a different color.

Further, the present embodiment is not restricted to the machining modes, machined portions and tool data indicated herein.

It will be apparent that the invention, as described above, achieves a tool specifying method which allows conditions for selection of the most appropriate tool to be specified optionally for each machining mode, whereby selection reference can be provided so that tool selection may be made according to a machining status.

The tool selection reference of this tool specifying method is so definite that which tool will be selected can be expected and know how on the tool selection of each operator can be incorporated by correcting the conditions.

Since a tool to be used is specified by the operator out of selected tools displayed on the screen in the order in which they seem to be more appropriate for machining, the tool selected can be changed optionally if it is not satisfactory. To ensure ease of selection for the operator, the tools are displayed on the screen in the order in which they seem to be more appropriate for machining.

The operator specifies a required tool while simultaneously viewing the tool data displayed on the screen, whereby simple input mistakes can be prevented and the tool to be used can be specified rapidly and reliably.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A tool specifying method in an NC automatic programming system for specifying a tool by displaying tool data consisting of at least tool shapes for identifying tools, comprising the steps of:
   1) setting and registering said tool data;
   2) setting and registering tool criteria appropriate for a machining mode, said tool criteria being specified in a range by the most appropriate value and a predetermined value greater or smaller than said most appropriate value;
   3) automatically arranging and displaying said tool data in accordance with said set criteria; and
   4) selecting and specifying desired tool data from among said tool data displayed.

2. A tool specifying method in an NC automatic programming system as defined in claim 1, wherein the automatic arranging and displaying step further comprises arranging said tool data in a first order in accordance with said set criteria, arranging said tool data not satisfying said criteria in a second order, and divisionally displaying said tool data satisfying said criteria and said tool data not satisfying said criteria in said arranged orders.

3. The tool specifying method in an NC automatic programming system as defined in claim 2, wherein said second order is based on tool numbers.

4. A tool specifying method in an NC automatic programming system as defined in claim 1, wherein said tool data satisfying said criteria is displayed in the order from the most to least appropriate tools.

5. A tool specifying method in an NC automatic programming system for specifying a tool by displaying tool data comprising at least tool shapes for identifying individual tools, comprising the steps of:
   1) setting and registering tool criteria which indicates which tool is appropriate for a particular machining mode;
   2) displaying said registered criteria;
   3) changing and re-registering said criteria if it is judged that said criteria displayed are not adequate; and
   4) rearranging and displaying said tool data in accordance with said changed criteria.

6. The tool specifying method as set forth in claim 5, wherein said criteria comprises at least one of (1) machining type and machined workpiece portion; (2) roughing or finishing machining; (3) tool type; and (4) tool parameter conditions.

7. A NC automatic programming system for creating a NC machining program in which a plurality of NC programs are stored and individual ones of said NC programs are selectable for controlling the machining of a workpiece by one of a plurality of available tools, said programs being interactively editable to provide a desired machining, the improvement comprising:
   automatic tool selection means for selecting the most appropriate one of said plurality of available tools on the basis of specified criteria, said tool criteria being specified in a range by the most appropriate value and a predetermined value greater or smaller than said most appropriate value.

8. The NC automatic programming system as set forth in claim 7, wherein said automatic tool selection means further comprises:
   means for setting and registering tool data;
   means for setting and registering tool criteria appropriate for a machining mode;
   means for rearranging and displaying said tool data in accordance with said set criteria; and
   means for selecting and specifying desired tool data from among said tool data displayed.

9. The NC automatic programming system as set forth in claim 7 wherein said criterion comprises at least one of (1) machining type and machined workpiece portion; (2) roughing or finishing machining; (3) tool type; and (4) tool parameter conditions.

10. A tool specifying apparatus for an NC automatic programming system comprising:
    means for displaying tool data comprising graphic information on all the tools loaded on a machine tool;
    means for setting and registering said tool data;
    means for setting and registering tool criteria appropriate for a machining mode, said criteria being specified as a range between the most appropriate value and a predetermined value greater or smaller than the most appropriate value
    means for arranging said tool data in accordance with said set criteria;
    means for displaying said arranged tool data; and
    means for selecting and specifying desired tool data from among said tool data displayed.

11. A tool specifying apparatus in an NC automatic programming system as defined in claim 10, wherein said arranging means is operative to arrange said tool data in a first order in accordance with said set criteria and to arrange said tool data not satisfying said criteria in a second order.

12. A tool specifying apparatus in an NC automatic programming system as defined in claim 11, wherein said means for displaying is operative to divisionally display said tool data satisfying said criteria and said tool data not satisfying said criteria.

13. A tool specifying apparatus in an NC automatic programming system as defined in claim 12, wherein said divisional display is correspondingly in said arranged first and second orders.

14. A tool specifying apparatus in an NC automatic programming system as defined in claim 11, wherein said first order comprises the order from the most to least appropriate tools.

15. A tool specifying apparatus in an NC automatic programming system as defined in claim 10, further comprising:
    means for changing and registering said criteria if it is judged that said criteria displayed are not as desired; and
    means for rearranging said tool data in accordance with said criteria changed.

16. The NC automatic programming system as set forth in claim 15, wherein said criteria comprises at least one of (1) machining type and machined workpiece portion; (2) roughing or finishing machining; (3) tool type; and (4) tool parameter conditions.

17. A tool specifying method in an NC automatic programming system for selecting a tool by displaying tool data for identifying individual tools, comprising the steps of:
    setting and registering a plurality of tool criteria ranges which indicate which tool is appropriate for a particular machining mode, each of said tool criteria ranges representing a particular machining condition and being defined between a value assigned to a most appropriate tool for a particular machining operation and a predetermined value assigned to an acceptable tool, said values for each tool criteria range being selected based on a suitability of a tool for a corresponding condition of the particular machining mode;
    selecting an appropriate tool based on all of said tool criteria ranges.

* * * * *